(12) United States Patent
Kitajima

(10) Patent No.: US 6,188,207 B1
(45) Date of Patent: Feb. 13, 2001

(54) SWITCHING POWER SUPPLY

(75) Inventor: Nobuo Kitajima, Tokyo (JP)

(73) Assignee: TDK Corporation, Tokyo (JP)

( * ) Notice: Under 35 U.S.C. 154(b), the term of this patent shall be extended for 0 days.

(21) Appl. No.: 09/534,338

(22) Filed: Mar. 24, 2000

(30) Foreign Application Priority Data

Mar. 26, 1999 (JP) .................................................. 11-084985

(51) Int. Cl.⁷ ...................................................... G05F 1/10
(52) U.S. Cl. .......................................... 323/222; 323/289
(58) Field of Search .................................. 323/222, 289, 323/290, 288

(56) References Cited

U.S. PATENT DOCUMENTS

| | | | |
|---|---|---|---|
| 5,691,632 | * 11/1997 | Otake | 323/222 |
| 5,929,615 | * 7/1999 | D'Angelo et al. | 323/222 |
| 5,994,882 | * 11/1999 | Ma | 323/222 |

FOREIGN PATENT DOCUMENTS 5-284734   10/1993   (JP) .
8-289534   11/1996   (JP) .

* cited by examiner

*Primary Examiner*—Shawn Riley
(74) *Attorney, Agent, or Firm*—Oblon, Spivak, McClelland, Maier & Neustadt, P.C.

(57)                ABSTRACT

The choke coil is in series at one of a pair of source supply lines, and the switching element is connected between the pair of source supply lines and intermittently cuts off the DC input voltage. The rectifier/smoothing circuit is input with a voltage achieved by superimposing a flyback voltage onto the DC input voltage. The flyback voltage is generated at the choke coil while the switching element is set in an OFF state. The synchronous rectifying device is constituted of an NPN transistor. The smoothing capacitor outputs a stepped up DC voltage at a first and second end, with the first end being connected to the synchronous rectifying device. The auxiliary winding is magnetically coupled with the choke coil, and the DC blocking capacitor is provided between the auxiliary winding and a base of the NPN transistor. The reset circuit is connected between the base of the NPN transistor and any one of the first and second end of the smoothing capacitor.

5 Claims, 2 Drawing Sheets

SWITCHING POWER SUPPLY

BACKGROUND OF THE INVENTION

1. Field of the Invention

The present invention relates to a switching power supply adopting a synchronous rectification method, and more particularly to a step-up switching power supply that achieves an improvement in the power conversion efficiency by reducing the loss at the rectifying device.

2. Discussion of Background

Switching power supplies, achieving a high degree of power conversion efficiency and can be constituted as compact units, are adopted in a wide range of applications - as power sources in various types of industrial apparatuses and consumer apparatuses including computers and office automation apparatuses. At present, as battery driven apparatuses such as portable information terminals and communication apparatuses are used by a greater than ever number of people, step - up switching power supplies need to achieve a further improvement in the efficiency.

As a means for meeting this requirement, switching power supplies adopting a synchronous rectification method have been proposed. Such switching power supplies adopt a synchronous rectification method and are developed based upon the principle that the saturation voltage between the collector and the emitter of a transistor in an ON state is lower than the forward descending voltage at a diode. The diode is normally used as a rectifying device in a rectifier circuit in the prior art. The switching power supply achieves an improvement in the switching source efficiency by replacing a diode with a transistor to reduce the power loss occurring at the rectifying device.

An example of a switching power supply adopting the synchronous rectification method is disclosed in Japanese Unexamined Patent Publication No. 289534/1996. The switching power supply disclosed in this publication is a step-up/step-down switching power supply adopting the synchronous rectification method. The switching power supply is provided with a choke coil to which a DC input voltage is applied, a switching element that cuts off the voltage intermittently, and a rectifier/smoothing circuit that rectifies and smooths the switching output. A synchronous rectifying device at the rectifier/smoothing circuit is constituted of a bipolar PNP transistor. The voltage manifesting at the two ends of the choke coil is used as a drive signal for the PNP transistor. Thus, compared to switching power supplies that employ a diode as the rectifying device, the power loss can be reduced. Furthermore, since the voltage manifesting at the two ends of the choke coil is directly utilized as a drive signal for the PNP transistor, an advantage is achieved in that the drive circuit is realized through a simple structure.

However, the saturation voltage between the collector and the emitter of a bipolar PNP transistor is high, at approximately 0.2V compared to the saturation voltage in a bipolar NPN transistor which is normally approximately 0.1V. Thus, it is difficult to make the most of the advantages of the bipolar transistor in a switching power supply adopting the synchronous rectification method that employs a PNP transistor for a current control element.

In addition, a bipolar high frequency power transistor, which is ideal in applications in this type of switching power supply, is constituted of silicon, and the relative difficulty in manufacturing PNP silicon transistors compared to NPN silicon transistors presents a stumbling block in achieving an inexpensive switching power supply.

SUMMARY OF THE INVENTION

It is an object of the present invention to provide an inexpensive switching power supply adopting a synchronous rectification method that achieves a higher degree of power conversion efficiency.

In order to achieve the object described above, the switching power supply according to the present invention comprises a choke coil, a switching element and a rectifier/smoothing circuit.

The choke coil is in series at one of a pair of source supply lines to which a DC input voltage is supplied. The switching element, which is connected between the pair of source supply lines, intermittently cuts off the DC input voltage applied to the choke coil.

The rectifier/smoothing circuit includes a synchronous rectifying device, a smoothing capacitor and a base drive circuit, and has a voltage input. This voltage is achieved by superimposing a flyback voltage onto the DC input voltage. The flyback voltage is generated at the choke coil while the switching element is in an OFF state.

The synchronous rectifying device is constituted of an NPN transistor. The smoothing capacitor has a first end and a second end, with the first end being connected to the synchronous rectifying device. The smoothing capacitor outputs a stepped up DC voltage at the first and second end of the smoothing capacitor.

The base drive circuit includes an auxiliary winding, a DC blocking capacitor and a reset circuit. The auxiliary winding is magnetically coupled with the choke coil. The DC blocking capacitor is provided between the auxiliary winding and the base of the NPN transistor.

The reset circuit is connected between the base of the NPN transistor and any one of the first end and the second end of the smoothing capacitor.

Since the switching power supply according to the present invention employs an NPN transistor as its synchronous rectifying device as described above, the advantage achieved through the low level of the saturation voltage between the collector and the emitter of the bipolar transistor can be made the most of to provide a switching power supply that achieves high power conversion efficiency. In addition, since the price of an NPN transistor is lower than that of a PNP transistor and a base current is supplied simply by adding one winding to the coil, an inexpensive switching power supply can be provided.

BRIEF DESCRIPTION OF THE DRAWINGS

A more complete appreciation of the invention and many of the attendant advantages thereof become better understood when referring to the following detailed description of the accompanied drawings, in which.

DETAILED DESCRIPTION OF THE PREFERRED EMBODIMENTS

Figure 1:
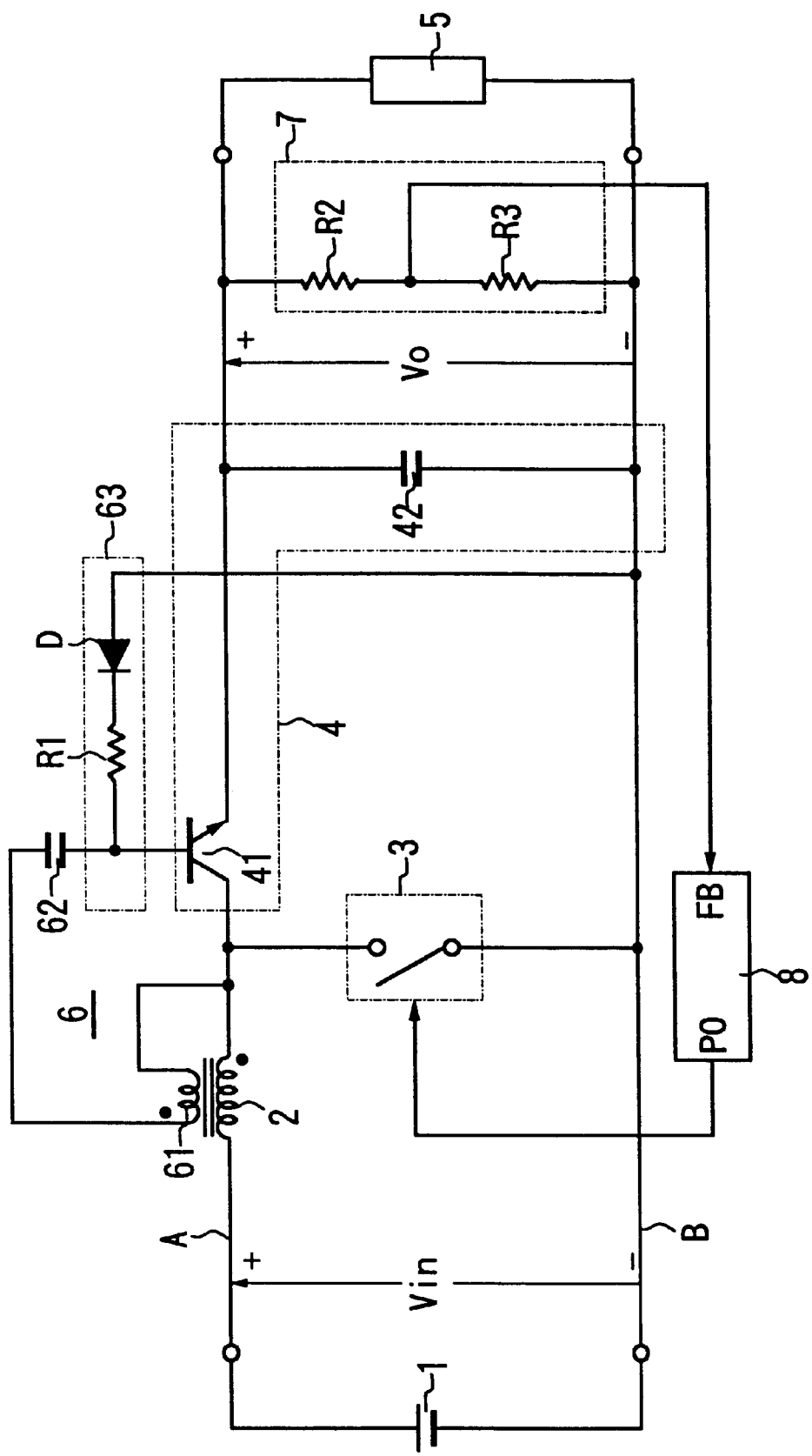
FIG. 1 is a circuit diagram of an embodiment of the switching power supply according to the present invention.

In FIG. 1, the switching power supply according to the present invention comprises a choke coil 2, a switching element 3 and a rectifier/smoothing circuit 4.

The choke coil 2 is in series at a source supply line A that is one of a pair of source supply lines A and B to which a DC input voltage Vin is supplied In more specific terms, one end of the choke coil 2 is connected to one end of a DC input voltage source 1, with the other end of the choke coil 2 connected to the other end of the DC input voltage source 1 via the switching element 3. No specific requirements are imposed upon the DC input voltage source 1 as long as it outputs a DC, and typically, the DC input voltage source 1 may be constituted of a battery or a source that outputs a DC obtained by rectifying and smoothing a commercial AC. Alternatively, an output from another DC source apparatus may be utilized.

The switching element 3, which is connected between the pair of source supply lines A and B, intermittently cuts off the DC input voltage Vin applied to the choke coil 2. The switching element 3 may be constituted of a bipolar transistor, an FET or another type of semiconductor switching element provided with a control electrode.

A voltage achieved by superimposing a flyback voltage onto the DC input voltage Vin is input to the rectifier/smoothing circuit 4. The flyback voltage is generated at the choke coil 2 while the switching element 3 is in an OFF state.

The rectifier/smoothing circuit 4 includes a synchronous rectifying device 41, a smoothing capacitor 42 and a base drive circuit 6. The synchronous rectifying device 41 is constituted of an NPN transistor. In the following explanation, the synchronous rectifying device 41 is to be referred to as the NPN transistor 41. The collector of the NPN transistor 41 is connected to the other end of the choke coil 2.

The smoothing capacitor 42 has a first end and a second end, with the first end being connected to the emitter of the NPN transistor 41. The smoothing capacitor 42 outputs a stepped up DC voltage Vo at the first end and the second end.

The base drive circuit 6 includes an auxiliary winding 61, a DC blocking capacitor 62 and a reset circuit 63. The auxiliary winding 61 is magnetically coupled with the choke coil 2. One end of the auxiliary winding 61 is connected to the collector of the NPN transistor 41 and its other end is connected to the base of the NPN transistor 41 via the DC blocking capacitor 62. The auxiliary winding 61 is wound along the direction in which a base current is supplied to the NPN transistor 41 via the DC blocking capacitor 62 by using the voltage induced by the flyback voltage generated at the choke coil 2.

The DC blocking capacitor 62 is provided between the auxiliary winding 61 and the base of the NPN transistor 41.

During the period of time over which the NPN transistor 41 is set in an OFF state, the reset circuit 63 discharges the electrical charge stored at the DC blocking capacitor 62 while the NPN transistor 41 has been in an ON state. The reset circuit 63 in the figure assumes a structure achieved by connecting the base of the NPN transistor 41 to the other end (the lower potential side) of the smoothing capacitor 42 via the serial circuit constituted of a resistor R1 and a diode D. By adopting this structure, in which the base of the NPN transistor 41 is connected to the other end of the smoothing capacitor 42 with a small potential difference while the NPN transistor 41 stays in an OFF state, the loss can be reduced.

The time constant that sets the length of time over which the NPN transistor 41 remains in an OFF state is the product of the capacity of the DC blocking capacitor 62 and the resistance value at the resistor R1. Since the DC blocking capacitor 62 and the resistor R1 in the switching power supply according to the present invention can be selected from a wide range of possibilities, a higher degree of freedom in design is afforded through suitable selection of the DC blocking capacitor 62 and the resistor R1 to achieve specific characteristics at the switching element 3 and the NPN transistor 41 and specific timing with which the switching element 3 and the NPN transistor 41 are turned ON/OFF so that a switching power supply conforming to required specifications and achieving required characteristics can be provided with ease.

The switching power supply in FIG. 1 further includes a load 5, an output voltage detection circuit 7 and a control circuit 8. The load 5 is connected to the first and second end of the smoothing capacitor 42. The output voltage detection circuit 7, which is constituted of voltage dividing resistors R2 and R3, is connected to the first and second end of the smoothing capacitor 42. The control circuit 8, which includes an oscillation circuit adopting a self excitation system or a separate excitation system or achieved through a combination of these, controls the ON/OFF state of the switching element 3 through a control method such as pulse width modulation or frequency modulation based upon a voltage detection signal provided by the output voltage detection circuit 7 so as to set the output voltage Vo supplied to the load 5 to a specific value.

Next, the operation of the switching power supply structured as described above is explained. As the control circuit 8 implements ON/OFF control on the switching element 3, a voltage is intermittently applied to the choke coil 2. During the period of time over which the switching element 3 stays in an ON state, the base current is not supplied to the NPN transistor 41 and, as a result, the NPN transistor 41 sustains an OFF state. Thus, power is not communicated to the output side and energy is stored at the choke coil 2.

Next, when the switching element 3 enters an OFF state, a flyback voltage is generated at the choke coil 2 and at the same time, the base current is supplied to the NPN transistor 41 by the auxiliary winding 61 which is magnetically coupled with the choke coil 2 via the DC blocking capacitor 62 to charge the DC blocking capacitor 62 and set the NPN transistor 41 to an ON state. Thus, the voltage achieved by superimposing the flyback voltage generated at the choke coil 2 onto the DC input voltage Vin, is supplied to the rectifier/smoothing circuit 4 to charge the smoothing capacitor 42.

When the switching element 3 enters an ON state again, a reverse bias is applied to the NPN transistor 41 to set it in an OFF state, and the electrical charge stored at the DC blocking capacitor 62 is released via diode D and resistor RI at the reset circuit 63.

By repeating the process described above, the smoothing capacitor 42 becomes charged and the stepped up DC voltage Vo is supplied to the load 5.

Since the switching power supply according to the present invention employs the NPN transistor 41 as its synchronous rectifying device, the loss attributable to the rectifying device can be reduced compared to a switching power supply that employs a PNP transistor.

For instance; while the saturation voltage between the collector and the emitter of the 2SD1801, which may be employed in this type of switching power supply and is an NPN switching transistor with a rated current of 2 A, is 0.1V, the saturation voltage between the collector and the emitter of the 2SB1201, which is a PNP transistor with an equivalent rating, is 0.2V.

When the PNP transistor is employed in a 5 W output switching power supply at 5V/1 A, for instance, a loss of 0.2 W occurs at the rectifying device, whereas by employing the NPN transistor in the same switching power supply, the loss can be reduced to 0.1 W.

In addition, as an increasingly lower voltage is used to drive semiconductor elements such as ICs in recent years, switching power supplies are also required to output lower voltages. If the output voltage becomes reduced at a given output capacity, the difference in the loss mentioned above becomes more pronounced.

Namely, while the loss at a switching power supply with the same output capacity as above, i.e., 5 W, with a 2.5V, 2 A output, constituted by using the PNP transistor is 0.4 W, the loss is reduced to 0.2 W in a switching power supply achieved by employing the NPN transistor as in the present invention, resulting in the difference in the loss doubled to 0.2 W.

Figure 2:
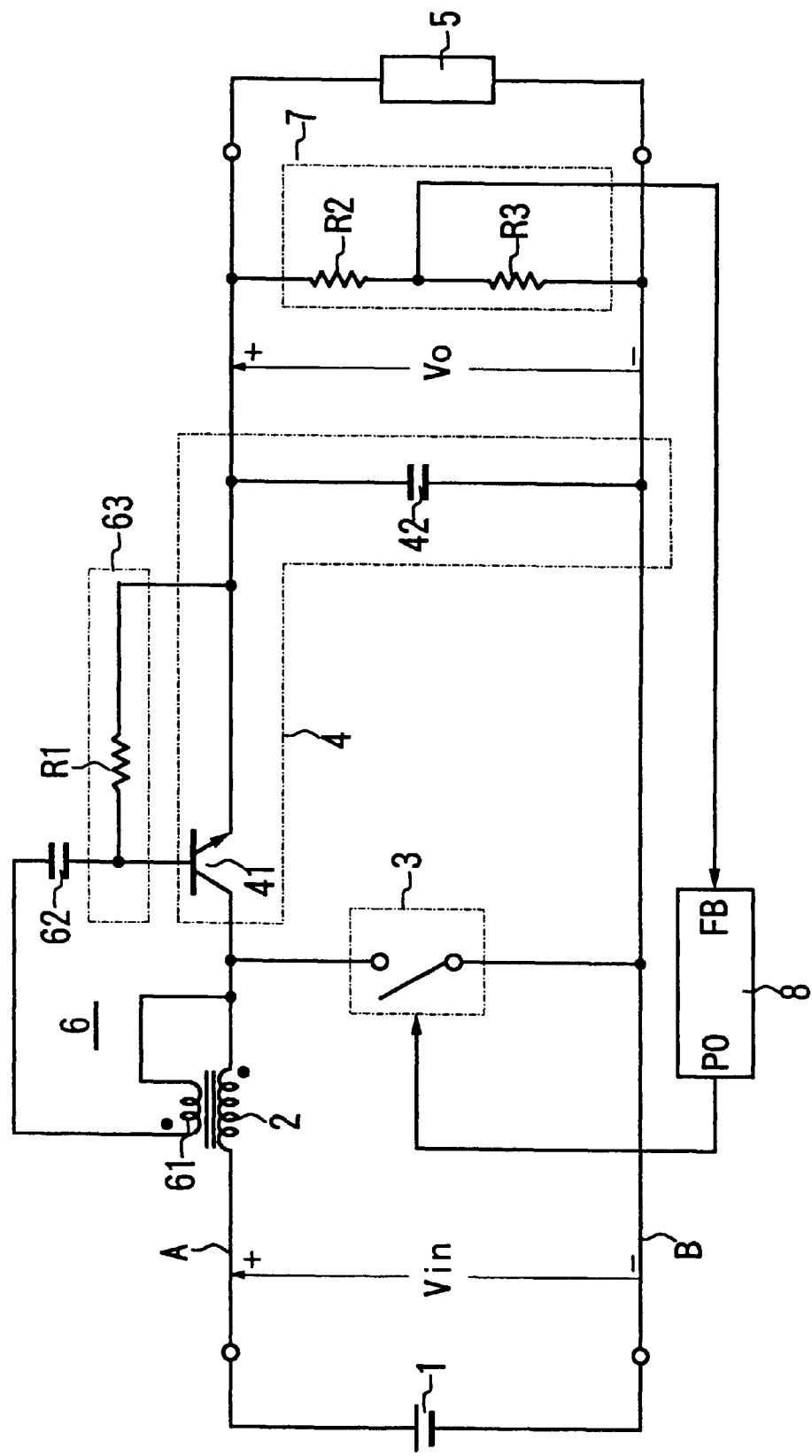
FIG. 2 is a circuit diagram of another embodiment of the switching power supply according to the present invention.

FIG. 2 illustrates another embodiment of the switching power supply according to the present invention. In the figure, the same reference numbers are assigned to components identical to those in FIG. 1 to preclude the necessity for a repeated explanation thereof. This embodiment is characterized in that the base of the NPN transistor 41 is connected to the first end of the smoothing capacitor 42 via the resistor R1 in the reset circuit 63. Unlike in the circuit illustrated in FIG. 1, the diode for reverse blocking is not provided.

The operation of the switching power supply in FIG. 2 is basically the same as the operation of the switching power supply in FIG. 1. However, unlike in the switching power supply in FIG. 1, when a reverse bias is applied to the NPN transistor 41 to set it in an OFF state, the electrical charge stored at the DC blocking capacitor 62 is released to the first end of the smoothing capacitor 42 via the resistor R1 of the reset circuit 63. During an initial period of discharge, a voltage approximately equal to the difference between the terminal voltage at the DC blocking capacitor 62 and the output voltage Vo is applied to the resistor R1.

While the embodiments of the present invention have been explained by referring to the attached drawings, it is obvious that there are combinations of circuits and variations not shown here that can be achieved based upon the embodiments.

As explained above, according to the present invention, a highly efficient and less expensive switching power supply adopting a synchronous rectification method is provided.

What is claimed is:

1. A switching power supply, comprising:

a choke coil being in series at one of a pair of source supply lines to which a DC input voltage is supplied;

a switching element connected between said pair of source supply lines, said switching element intermittently cutting off said DC input voltage applied to said choke coil; and a rectifier/smoothing circuit being input with a voltage achieved by superimposing a flyback voltage onto said DC input voltage, said flyback voltage being generated at said choke coil while said switching element is set in an OFF state, said rectifier/smoothing circuit including:

a synchronous rectifying device constituted of an NPN transistor;

a smoothing capacitor having a first end and a second end, said smoothing capacitor outputting a stepped up DC voltage at said first end and said second end, said first end being connected to said synchronous rectifying device; and a base drive circuit including:

an auxiliary winding magnetically coupled with said choke coil;

a DC blocking capacitor provided between said auxiliary winding and a base of said NPN transistor; and a reset circuit connected between said base of said NPN transistor and any one of said first end and said second end of said smoothing capacitor.

2. The switching power supply of claim 1, wherein said reset circuit is connected between said base of said NPN transistor and said second end of said smoothing capacitor.

3. The switching power supply of claim 2, wherein said reset circuit comprises a serial circuit including a resistor and a diode.

4. The switching power supply of claim 1, wherein said reset circuit is connected between said base of said NPN transistor and said first end of said smoothing capacitor.

5. The switching power supply of claim 4, wherein said reset circuit is a resistor circuit.

* * * * *